United States Patent
Christie et al.

(10) Patent No.: US 11,415,048 B2
(45) Date of Patent: Aug. 16, 2022

(54) NACELLE FOR GAS TURBINE ENGINE

(71) Applicant: ROLLS-ROYCE PLC, London (GB)

(72) Inventors: Robert E Christie, Cranfield (GB);
David G MacManus, Olney (GB);
Christopher T J Sheaf, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 17/231,421

(22) Filed: Apr. 15, 2021

(65) Prior Publication Data
US 2021/0355872 A1    Nov. 18, 2021

(30) Foreign Application Priority Data

May 13, 2020   (GB) ..................... 2007010

(51) Int. Cl.
*F02C 7/04*       (2006.01)
*F02K 3/068*     (2006.01)
*B64D 33/02*    (2006.01)

(52) U.S. Cl.
CPC ............. *F02C 7/04* (2013.01); *F02K 3/068* (2013.01); *B64D 2033/0286* (2013.01); *F05D 2220/32* (2013.01); *F05D 2240/12* (2013.01); *F05D 2240/14* (2013.01)

(58) Field of Classification Search
CPC .......... F02C 7/04–057; F02C 7/00–057; F02K 3/068; B64D 33/02; B64D 2033/0206–0286
See application file for complete search history.

(56) References Cited

U.S. PATENT DOCUMENTS

| | | | | |
|---|---|---|---|---|
| 2,948,111 | A * | 8/1960 | Nelson | F02C 7/042 137/15.1 |
| 5,058,617 | A * | 10/1991 | Stockman | B64D 33/02 137/15.1 |
| 6,708,711 | B2 * | 3/2004 | Surply | F02C 7/045 137/15.1 |
| 7,797,944 | B2 * | 9/2010 | Morford | F02K 1/15 60/771 |
| 8,286,654 | B2 * | 10/2012 | Prasad | B64D 33/02 137/15.1 |

(Continued)

OTHER PUBLICATIONS

Magrini and Benini, Study of geometric parameters for the design of short intakes with fan modelling, Feb. 1, 2022, Chinese Journal of Aeronautics, retrieved online via Science Direct at https://www.sciencedirect.com/science/article/pii/S1000936122000188#f0030 (Year: 2022).*

(Continued)

*Primary Examiner* — Stephanie Sebasco Cheng
(74) *Attorney, Agent, or Firm* — Oliff PLC

(57) ABSTRACT

A nacelle for a gas turbine engine having a longitudinal centre line. The nacelle includes an air intake disposed at an upstream end of the nacelle. The air intake includes, in flow series, an intake lip, a throat and a diffuser. The diffuser further includes a diffuser angle ($\theta_{diff}$), indicating a degree of divergence of the diffuser relative to the longitudinal centre line. The diffuser angle ($\theta_{diff}$) is from about 0 degrees to about 12 degrees.

12 Claims, 4 Drawing Sheets

(56) References Cited

U.S. PATENT DOCUMENTS

| | | | |
|---|---|---|---|
| 8,727,267 B2* | 5/2014 | Jain | F02K 3/06 244/53 B |
| 9,228,534 B2* | 1/2016 | Jain | B64D 33/02 |
| 2003/0084936 A1* | 5/2003 | Surply | F02C 7/045 137/15.1 |
| 2005/0060982 A1* | 3/2005 | Mani | F02C 7/045 181/213 |
| 2005/0274103 A1 | 12/2005 | Prasad et al. | |
| 2008/0283676 A1 | 11/2008 | Jain et al. | |
| 2008/0310956 A1* | 12/2008 | Jain | B64D 33/02 415/200 |
| 2011/0072828 A1 | 3/2011 | Winter et al. | |
| 2015/0292352 A1 | 10/2015 | Marche | |
| 2016/0003145 A1* | 1/2016 | Qiu | F02K 3/06 60/726 |
| 2016/0108811 A1 | 4/2016 | Mosley et al. | |
| 2017/0158341 A1* | 6/2017 | Kawai | B64D 33/02 |
| 2017/0298954 A1* | 10/2017 | Qiu | F02K 3/06 |
| 2019/0107050 A1* | 4/2019 | Green | F02C 7/04 |
| 2021/0062757 A1* | 3/2021 | Lim | F02C 3/113 |
| 2021/0062758 A1* | 3/2021 | Sheaf | F02K 3/06 |
| 2021/0062759 A1* | 3/2021 | Lim | F02K 3/062 |
| 2021/0062760 A1* | 3/2021 | Sheaf | F02K 3/025 |
| 2021/0062761 A1* | 3/2021 | Lim | F02K 3/025 |

OTHER PUBLICATIONS

Luidens and Stockman et al., An Approach to Optimum Subsonic Inlet Design, 1979, ASME, 79-GT-51 (Year: 1979).*
Jul. 27, 2020 Search Report issued in British Patent Application No. 2007010.8.

* cited by examiner

NACELLE FOR GAS TURBINE ENGINE

CROSS-REFERENCE TO RELATED APPLICATIONS

This specification is based upon and claims the benefit of priority from United Kingdom patent application number GB 2007010.8 filed on May 13, 2020, the entire contents of which is incorporated herein by reference.

BACKGROUND

Technical Field of the Disclosure

The present disclosure relates to a nacelle and in particular to a nacelle for a gas turbine engine.

Description of the Related Art

A gas turbine engine typically includes a fan housed within a nacelle. Current gas turbine engines generally have a low specific thrust to keep noise at acceptable levels and to achieve low fuel consumption, because a low specific thrust helps to improve specific fuel consumption (SFC). This low specific thrust is usually achieved with a high bypass ratio. Therefore, as the specific thrust reduces, there is a concomitant increase in fan diameter. In order to accommodate a larger diameter fan, dimensions of the nacelle may have to be increased proportionally, thereby increasing size of engines. This typically results in a nacelle having increased drag and mass. Increase in drag and mass of the nacelle may both result in an increase in fuel consumption.

For large podded engines, there is a need to reduce the overall nacelle length so that there may be a minimum increase in nacelle drag and mass. This reduction in nacelle length may result in short intakes relative to conventional designs. However, no viable design parameters exist for short intakes. Conventional design methodologies may only be suitable for conventional long nacelles and not applicable to nacelles with short intakes.

SUMMARY OF THE DISCLOSURE

According to a first aspect, there is provided a nacelle for a gas turbine engine having a longitudinal centre line. The nacelle includes an air intake positioned at an upstream end of the nacelle. The air intake includes, in flow series, an intake lip, a throat and a diffuser. The diffuser includes a diffuser angle ($\theta_{diff}$) indicating a degree of divergence of the diffuser relative to the longitudinal centre line. The diffuser angle ($\theta_{diff}$) ranges from about 0.1 degrees to about 12 degrees.

In some embodiments, the intake lip includes a highlight at a leading edge of the nacelle. The highlight includes a highlight radius ($R_{hi}$). The throat includes a throat radius ($R_{th}$). Further, a contraction ratio (CR) is disclosed as the square of a ratio ($R_{hi}/R_{th}$)$^2$ between the highlight radius ($R_{hi}$) and the throat radius ($R_{th}$). The contraction ratio (CR) ranges from about 1.15 to about 1.28.

In some embodiments, the air intake includes an intake length ($L_{int}$) defined axially along the longitudinal centre line between the leading edge of the nacelle and a downstream end of the diffuser. A ratio ($L_{int}/R_{hi}$) between the intake length (Lint) and the highlight radius ($R_{hi}$) is about 0.7.

In some embodiments, the intake lip further includes a lip length ($L_{lip}$) between the leading edge of the nacelle and the throat. An aspect ratio (AR) is disclosed as a ratio (($R_{hi}-R_{th}$)/$L_{lip}$)) of a difference between the highlight ($R_{hi}$) radius and the throat radius ($R_{th}$) and the lip length ($L_{lip}$). The aspect ratio (AR) ranges from about 2 to about 3.

In some embodiments, the highlight includes a crown and a keel spaced circumferentially apart by about 180 degrees relative to the longitudinal centre line.

In some embodiments, a scarf line is defined as a straight line between the crown and the keel. The highlight radius is defined as a distance between a midpoint of the scarf line and one of the crown and the keel measured along the scarf line.

In some embodiments, the throat radius is defined as a distance between the midpoint of the scarf line and the throat measured along the scarf line.

In some embodiments, the intake length is defined as an axial distance between the midpoint of the scarf line and the downstream end of the diffuser.

In an embodiment, the lip length is defined as an axial distance between the keel and the throat.

In some embodiments, a diffuser line is defined between the throat and the downstream end of the diffuser. In some embodiments, the diffuser angle ($\theta_{diff}$) is disclosed as an angle between the diffuser line and the longitudinal centre line.

In some embodiments, the intake lip further includes an outer surface and an inner surface. The highlight forms an annular boundary between the outer surface and the inner surface.

In some embodiments, the diffuser angle ($\theta_{diff}$) is greater than 7 degrees.

The contraction ratio CR, the aspect ratio AR, and the diffuser angle $\theta_{diff}$ may be viable design parameters for a nacelle having a shorter air intake as compared to conventional nacelles. Optimization of such design parameters may result in a short intake design of the nacelle with optimal aerodynamic performance.

Further, the contraction ratio CR, the aspect ratio AR and the diffuser angle $\theta_{diff}$ of the nacelle may be optimized for controlling various parameters, such as peak Mach number, shock strength, boundary layer growth, and local flow accelerations and decelerations. An effect of a fan on Mach number and flow diffusion may also be considered while optimizing the aforementioned design parameters of the nacelle.

The nacelle with the short air intake design may be suitable for use as an underwing-podded nacelle of an aircraft.

According to a second aspect, there is provided a gas turbine engine for an aircraft. The gas turbine engine includes the nacelle of the first aspect.

In some embodiments, the gas turbine engine further includes a fan received in the nacelle.

In some embodiments, the gas turbine further includes an engine core received within the nacelle.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

According to an aspect, there is provided an aircraft comprising a gas turbine engine as described and/or claimed herein. The aircraft according to this aspect is the aircraft for which the gas turbine engine has been designed to be attached.

According to an aspect, there is provided a method of operating a gas turbine engine as described and/or claimed herein.

According to an aspect, there is provided a method of operating an aircraft comprising a gas turbine engine as described and/or claimed herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
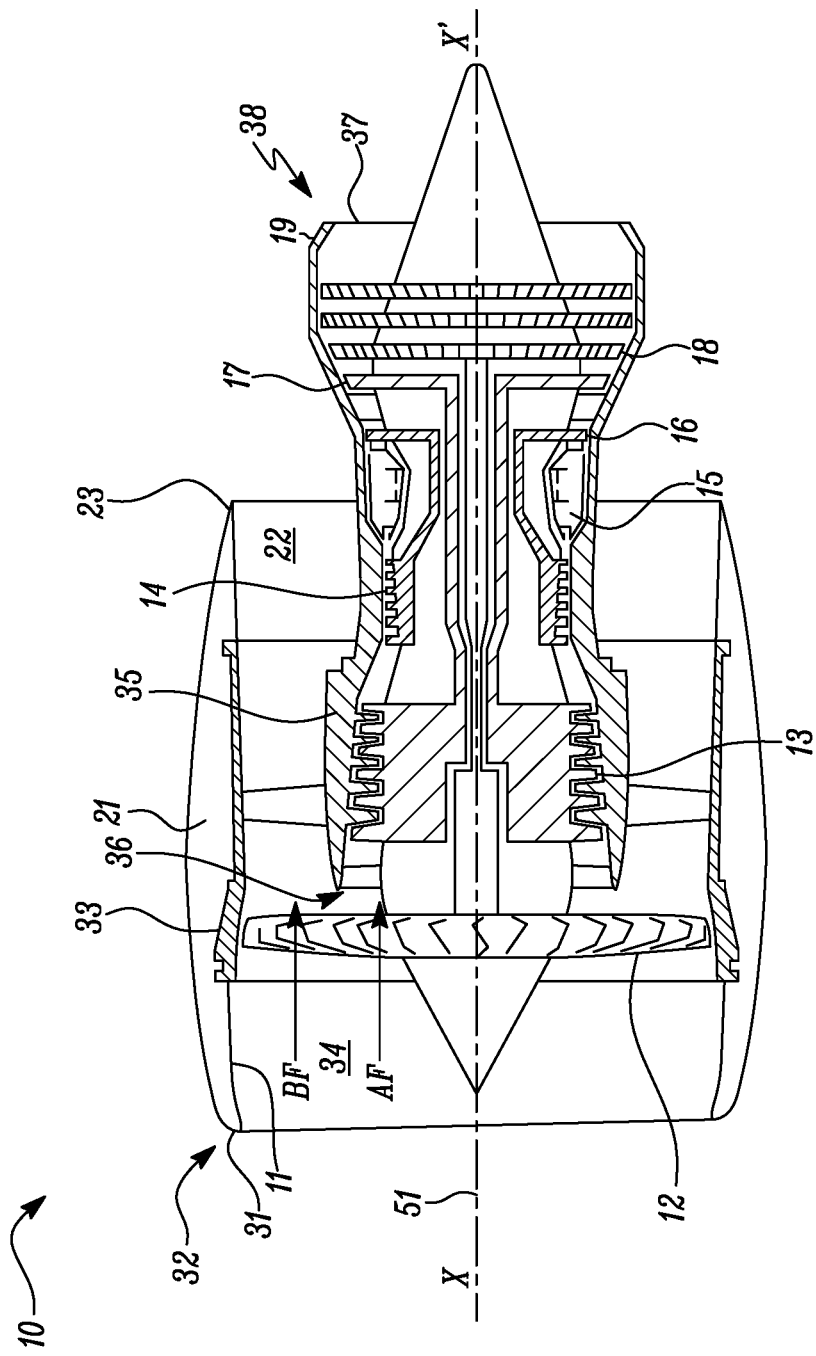
FIG. 1 is a sectional side view of a gas turbine engine.

FIG. 1 shows a ducted fan gas turbine engine 10 having a principal rotational axis X-X'. The principal rotational axis X-X' coincides with a longitudinal centre line 51 of the gas turbine engine 10.

In the following disclosure, the following definitions are adopted. The terms "upstream" and "downstream" are considered to be relative to an air flow through the gas turbine engine 10. The terms "axial" and "axially" are considered to relate to the direction of the principal rotational axis X-X' of the gas turbine engine 10.

The gas turbine engine 10 includes, in axial flow series, an air intake 11, a propulsive fan 12, an intermediate pressure compressor 13, a high pressure compressor 14, combustion equipment 15, a high pressure turbine 16, an intermediate pressure turbine 17, a low pressure turbine 18 and a core exhaust nozzle 19. A nacelle 21 generally surrounds the gas turbine engine 10 and defines the air intake 11, a bypass duct 22 and a bypass exhaust nozzle 23.

During operation, air entering the air intake 11 is accelerated by the fan 12 to produce two air flows: a first air flow AF into the intermediate pressure compressor 13 and a second air flow BF which passes through the bypass duct 22 to provide propulsive thrust. The intermediate pressure compressor 13 compresses the first air flow AF directed into it before delivering that air to the high pressure compressor 14 where further compression takes place.

The compressed air exhausted from the high pressure compressor 14 is directed into the combustion equipment 15 where it is mixed with fuel and the mixture is combusted. The resultant hot combustion products then expand through, and thereby drive the high, intermediate and low pressure turbines 16, 17, 18 before being exhausted through the core exhaust nozzle 19 to provide additional propulsive thrust. The high, intermediate and low pressure turbines 16, 17, 18 respectively drive the high and intermediate pressure compressors 14, 13 and the fan 12 by suitable interconnecting shafts.

In some embodiments, the gas turbine engine 10 is used in an aircraft. In some embodiments, the gas turbine engine 10 is an ultra-high bypass ratio engine (UHBPR).

The nacelle 21 further includes an intake lip 31 disposed at an upstream end 32 of the nacelle 21, a fan casing 33 downstream of the intake lip 31, a diffuser 34 disposed between the upstream end 32 and the fan casing 33, and an engine casing 35 downstream of the intake lip 31. The fan 12 is received within the fan casing 33. The fan 12 and the fan casing 33 are received within the nacelle 21. An engine core 36 of the gas turbine engine 10 including the intermediate pressure compressor 13, the high pressure compressor 14, the combustion equipment 15, the high pressure turbine 16, the intermediate pressure turbine 17, the low pressure turbine 18 and the core exhaust nozzle 19 is received within the nacelle 21. Specifically, the engine core 36 is received within the engine casing 35. The nacelle 21 further includes an exhaust 37 disposed at a downstream end 38 of the nacelle 21. The exhaust 37 may be a part of the engine casing 35. The exhaust 37 may at least partly define the core exhaust nozzle 19.

The nacelle 21 for the gas turbine engine 10 may be typically designed by manipulating a plurality of design variables. The selection of the design variables may be dependent on a cruise Mach speed of an aircraft the nacelle 21 is attached to, as well as considerations for integration of engine ancillaries, such as a thrust reversal unit (TRU). Optimisation of these variables may be required to minimise the cruise drag incurred due to size and design of the nacelle 21.

Figure 2:
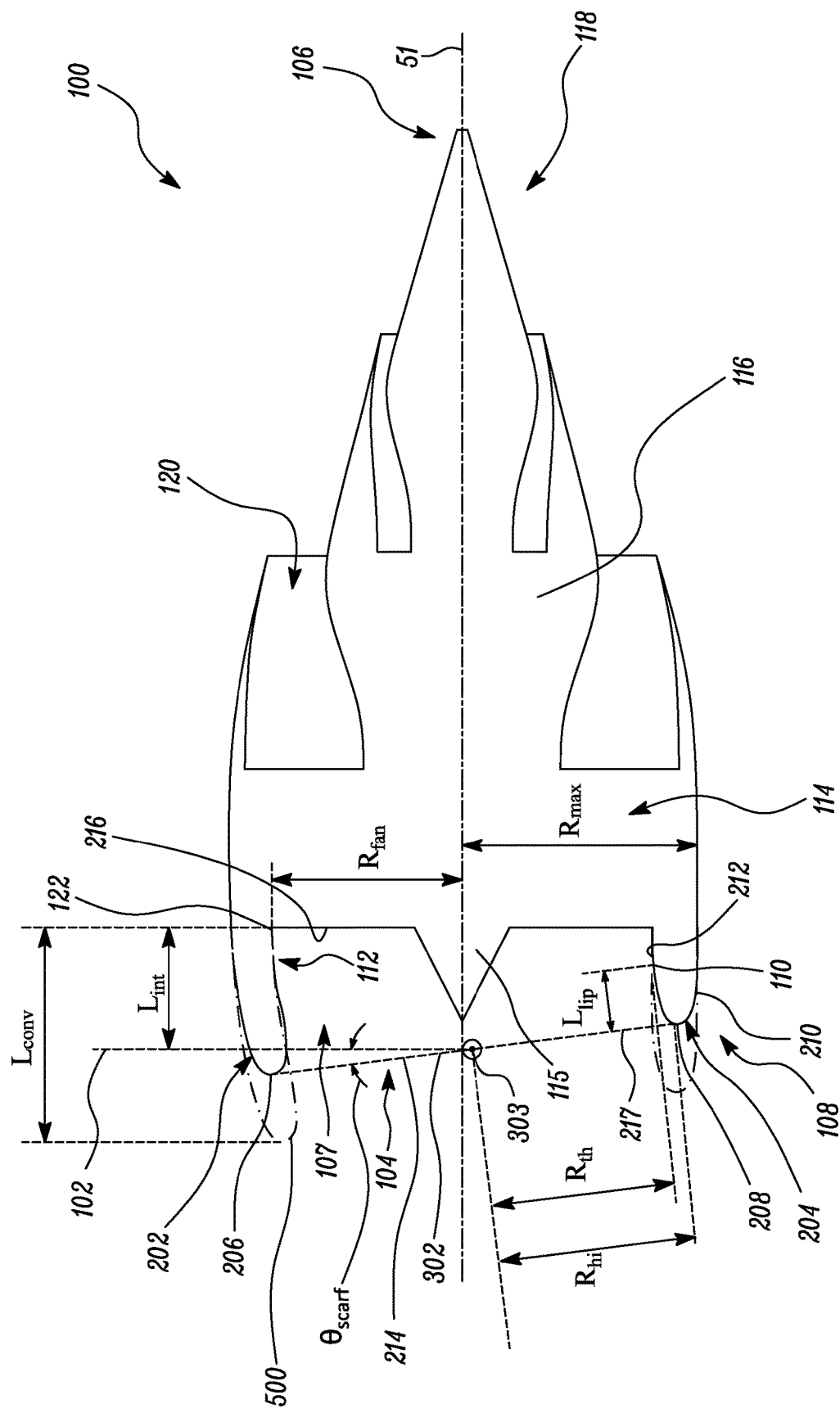
FIG. 2 is a schematic sectional side view of a nacelle of the gas turbine engine.

FIG. 2 illustrates a nacelle 100 for the gas turbine engine 10 (shown in FIG. 1) having the longitudinal centre line 51 in accordance with an embodiment of the present disclosure. The nacelle 100 may be formed using any suitable material. for example, the nacelle 100 may formed as a metal forging, with the metal being selected from the group comprising steel, titanium, aluminium and alloys thereof. Optionally, the nacelle 100 may be formed from a fibre reinforced composite material, with the composite fibre being selected from the group comprising glass, carbon, boron, aramid and combinations thereof. An advantage of using a fibre reinforced composite material to form the nacelle 100 is that its weight may be reduced over a nacelle formed from a metallic material.

As shown in FIG. 1, the longitudinal centre line 51 coincides with the principal rotational axis X-X' of the gas turbine engine 10. The nacelle 100 further includes a reference line 102 perpendicular to the longitudinal centre line 51. The longitudinal centre line 51 is also illustrated in FIG. 2.

Referring to FIG. 2, the nacelle 100 generally has a tubular structure including an upstream end 104 and a downstream end 106 opposite to the upstream end 104. The nacelle 100 according to the present disclosure is illustrated using solid lines. A portion of a conventional nacelle 500 is illustrated by dashed lines. The nacelle 100 may have a short nacelle design as compared to the conventional nacelle 500. The conventional nacelle 500 is provided for the purpose of illustration and for comparison with the nacelle 100 of the present disclosure.

The nacelle 100 includes an air intake 107 disposed at the upstream end 104 of the nacelle 100. As shown in FIG. 2, the air intake 107 of the nacelle 100 has an intake length $L_{int}$ that is less than a long intake length $L_{conv}$ of an air intake of the conventional nacelle 500. In other words, the air intake 107 conforming to the short nacelle design may be shorter in length as compared to the air intake of the conventional nacelle 500.

The air intake 107 of the nacelle 100 includes, in flow series, an intake lip 108, a throat 110 and a diffuser 112. The intake lip 108 is disposed at the upstream end 104 of the nacelle 100. The throat 110 is positioned adjacent to the intake lip 108 in the direction of air flow along the longitudinal centre line 51. The throat 110 may be disposed at an interface between the intake lip 108 and the diffuser 112. The nacelle 100 further includes a fan section 114 which accommodates a fan 12 (shown in FIG. 1). The fan section 114 further includes a fan hub 115. Fan blades 502 (shown in FIG. 4) extend radially outwardly from the fan hub 115 to respective blade tips 504. The fan section 114 is disposed downstream of and adjacent to the diffuser 112. The diffuser 112 is disposed between the upstream end 104 and the fan section 114. The diffuser 112 further defines a downstream end 122 of the diffuser 112 at the interface with the fan section 114. The nacelle 100 further includes an engine casing 116 disposed downstream of the fan section 114. The engine core 36 (shown in FIG. 1) is received within the engine casing 116. The engine casing 116 surrounds the engine core 36 (shown in FIG. 1). The nacelle 100 further incudes an exhaust 118 disposed at the downstream end 106 of the nacelle 100. In some embodiments, the nacelle 100 may be used in the gas turbine engine 10 (shown in FIG. 1) in an aircraft.

The nacelle 100 is generally terminated by the exhaust 118 whose outlet is located downstream of the engine casing 116. The exhaust 118 may exhaust the resultant hot combustion products from the combustion equipment 15 of the gas turbine engine 10 (shown in FIG. 1). The nacelle 100 may include a cowling disposed proximal to the downstream end 106. The cowling may be able to accommodate ancillaries, such as a TRU. The TRU may be any type, for example, target type, clam-shell type or cold stream type. The nacelle 100 further includes a bypass nozzle 120 disposed proximal to the downstream end 106. The bypass nozzle 120 may exhaust the bypass air.

The intake lip 108, the throat 110 and the diffuser 112 forms the air intake 107 to supply air to the fan 12 (shown in FIG. 1) of the gas turbine engine 10 during operation of the gas turbine engine 10. The air intake 107 may be further required to absorb noise generated by the gas turbine engine 10. The diffuser 112 may be sized and configured for reducing velocity of the airflow while increasing its static pressure.

The intake lip 108 includes a crown 202 and a keel 204. The intake lip 108 includes a top portion and a bottom portion defining the crown 202 and the keel 204, respectively. The crown 202 includes a crown leading edge 206 at an extreme upstream edge of the crown 202. Similarly, the keel 204 includes a keel leading edge 208 at an extreme upstream end of the keel 204. The crown 202 and the keel 204 are spaced circumferentially apart by about 180 degrees relative to the longitudinal centre line 51. In the illustrated embodiment of FIG. 2, the crown leading edge 206 is axially forward of the keel leading edge 208 relative to the longitudinal centre line 51. However, in alternative embodiments, the keel leading edge 208 may be axially forward of the crown leading edge 206 relative to the longitudinal centre line 51.

The intake lip 108 further includes an outer surface 210, an inner surface 212 and a highlight 214 (shown by a dashed line) forming an annular boundary between the outer surface 210 and the inner surface 212. The outer surface 210 may also correspond to an outer surface of the nacelle 100. The inner surface 212 may also correspond to an inner surface of the nacelle 100. The throat 110 and the diffuser 112 are defined by the inner surface 212 of the nacelle 100.

The highlight 214 may define a leading edge 217 of the nacelle 100. The leading edge 217 may be a continuous edge of the nacelle 100 disposed at the upstream end 104. The leading edge 217 may be an annular leading edge having a circumferential extent of 360 degrees around the longitudinal centre line 51. Therefore, the highlight 214 may also annular as the highlight 214 corresponds to the leading edge 217 of the nacelle 100. The highlight 214 includes the crown leading edge 206 and the keel leading edge 208. The highlight 214 may define a highlight radius $R_{hi}$ of the nacelle 100. The inner surface 212 and the outer surface 210 may define a radius of curvature of the intake lip 108. In some embodiments, the nacelle 100 may include one or more acoustic liners (not shown) provided on the inner surface 212 of the intake lip 108. The intake lip 108 further includes a lip length $L_{lip}$ between the leading edge 217 of the nacelle 100 and the throat 110. In other words, the lip length $L_{lip}$ is defined between the highlight 214 and the throat 110.

The throat 110 extends radially by a throat radius $R_{th}$ with respect to the longitudinal centre line 51. The fan section 114 extends radially by a fan radius $R_{fan}$ with respect to the longitudinal centre line 51.

The air intake 107 extends axially by the intake length $L_{int}$ with respect to the longitudinal centre line 51. The fan section 116 is disposed downstream of the intake lip 108. The fan section 116 includes a fan section leading edge 216. The fan section leading edge 216 may be an upstream edge of the fan section 116 facing the intake lip 108. The fan section leading edge 216 may extend radially from the fan hub 115 towards the inner surface 212 of the nacelle 100. The fan section leading edge 216 and the downstream end 122 of the diffuser 112 may be at generally the same axial location relative to the longitudinal centre line 51. The downstream end 122 may be formed at a point of intersection between the fan section leading edge 216 and the diffuser 122. The intake length $L_{int}$ is defined between the leading edge 217 of the nacelle 100 and the downstream end 122 of the diffuser 112. In other words, the intake length $L_{int}$ is defined between the highlight 214 and the downstream end 122 of the diffuser 112. The intake length $L_{int}$ may be defined along the longitudinal centre line 51.

The crown leading edge 206 and the keel leading edge 208 define a scarf line 302 therebetween. Specifically, the scarf line 302 is a straight line that joins the crown leading edge 206 and the keel leading edge 208. The scarf line 302 forms a scarf angle $\theta_{scarf}$ relative to the reference line 102 perpendicular to the longitudinal centre line 51. The scarf angle $\theta_{scarf}$ is indicative of an axial offset between the crown leading edge 206 and the keel leading edge 208 relative to the longitudinal centre line 51. A positive value of the scarf angle $\theta_{scarf}$ may correspond to the crown leading edge 206 being axially forward of the keel leading edge 208. On the other hand, a negative value of the scarf angle $\theta_{scarf}$ may correspond to the keel leading edge 208 being axially forward of the crown leading edge 206.

Some advantages of scarfing may include noise reduction, improved foreign object damage resistance, and improved keel high incidence angle of attack performance.

The scarf line 302 further defines a midpoint 303 between the crown leading edge 206 and the keel leading edge 208. The highlight radius $R_{hi}$ may be defined as the radius of the highlight 214 measured along the scarf line 302. In some embodiments, the highlight radius $R_{hi}$ is defined as a distance between midpoint 303 of the scarf line 302 and one of the crown 202 and the keel 204 measured along the scarf line 302. Specifically, the highlight radius $R_{hi}$ is measured along the scarf line 302 between the midpoint 303 and the crown leading edge 206 or the keel leading edge 208.

The throat radius $R_{th}$ may be defined as the radius of the throat 110 measured along the scarf line 302. In some embodiments, the throat radius $R_{th}$ is defined as the distance between the throat 110 and the midpoint 303 measured along the scarf line 302. The throat radius $R_{th}$ is less than the highlight radius $R_{hi}$. The nacelle 100 extends radially by a maximum radius $R_{max}$. The maximum radius $R_{max}$ is defined by the outer surface 210 of the nacelle 100 at the fan section 114.

In some embodiments, the intake length $L_{int}$ of the air intake 107 is defined as an axial distance between the midpoint 303 of the scarf line 302 and the downstream end 122 of the diffuser 112. Specifically, the intake length $L_{int}$ is measured along the longitudinal centre line 51 between the midpoint 303 of the scarf line 302 and the downstream end 122 of the diffuser 112. As shown in FIG. 2, the intake length $L_{int}$ of the air intake 107 of the nacelle 100 is less than the long intake length $L_{conv}$ of the conventional nacelle 500.

The nacelle 100 may also be optionally drooped. In such cases, a droop angle (not shown) may be defined between a normal to the fan section leading edge 216 and the longitudinal centre line 51. Some advantages of drooping may include improved low speed high incidence angle of attack performance.

Figure 3:
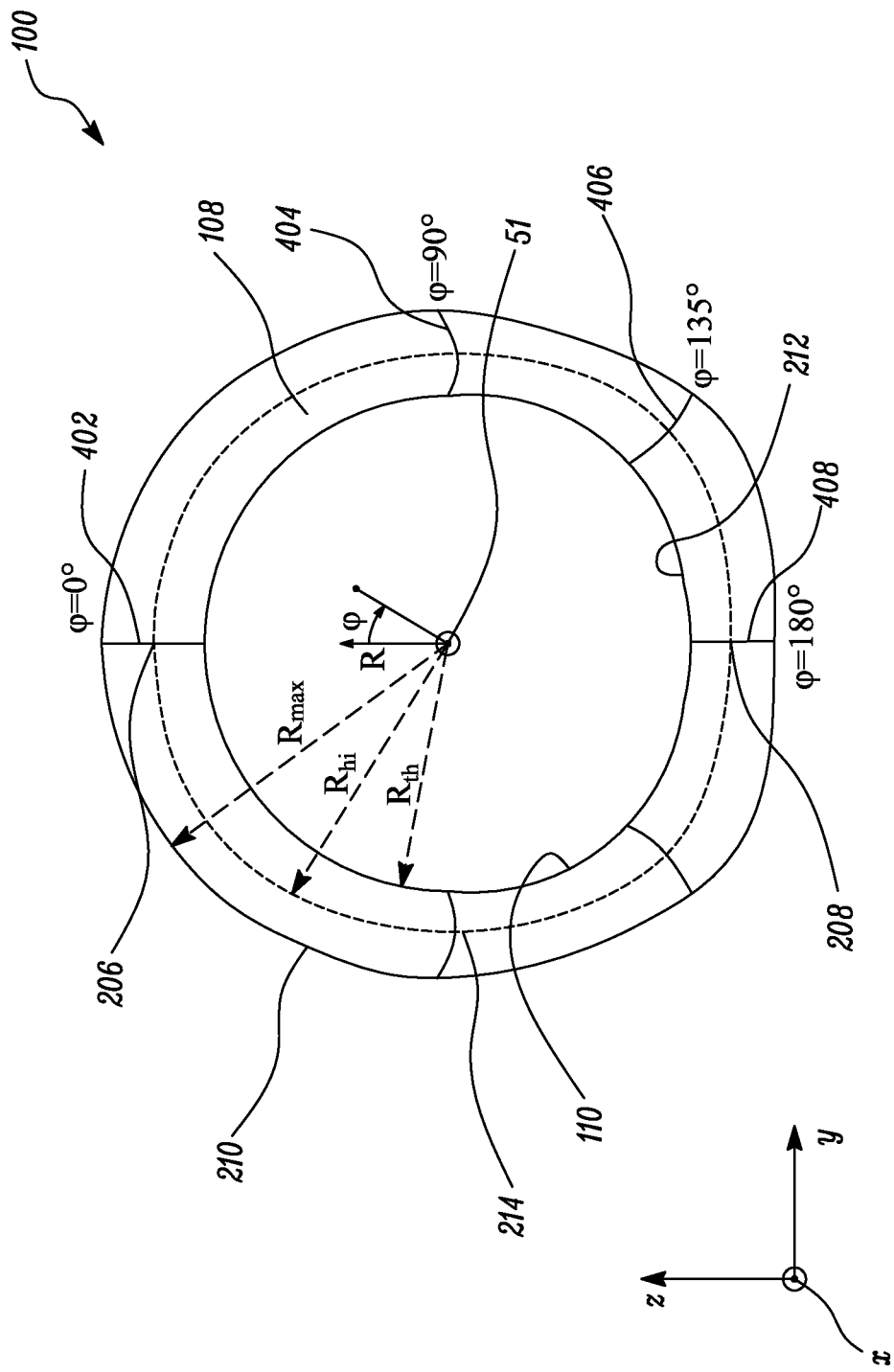
FIG. 3 is a front view of the nacelle of FIG. 2.

Referring to FIG. 3, a front view of the nacelle 100 is illustrated. The nacelle 100 defines a radial direction r and an azimuthal angle φ. The radial direction r is shown in a radially inner direction. Further, the azimuthal angle φ is shown in a clockwise direction. the azimuthal angle φ denotes a circumferential direction about the longitudinal centre line 51. The nacelle 100 further defines three mutually orthogonal axes x, y and z. The x-axis is generally parallel to the longitudinal centre line 51. The y-axis is defined along a generally horizontal direction, while the z-axis is defined along a generally vertical direction.

The throat 110 defines the throat radius $R_{th}$. The throat radius $R_{th}$ is defined at the inner surface 212 of the nacelle 100. The highlight 214 defines the highlight radius $R_{hi}$. The maximum radius $R_{max}$ is also shown in FIG. 3. The maximum radius $R_{max}$ is defined at the outer surface 210 of the nacelle 100. The nacelle 100 further defines axial lines at different values of the azimuthal angle φ. For example, the nacelle 100 defines a top line 402 at φ=0 degree, a side line 404 at φ=90 degree, a control line 406 at φ=135 degrees and a bottom line 408 at φ=180 degrees. The different axial lines may be used to define the air intake 107. The throat radius $R_{th}$, the highlight radius $R_{hi}$ and the maximum radius $R_{max}$ vary azimuthally. Specifically, the throat radius $R_{th}$, the highlight radius $R_{hi}$ and the maximum radius $R_{max}$ may be a function of the azimuthal angle φ. The nacelle 100 may have an axial plane of symmetry oriented along φ=0 degree and φ=180 degrees.

A point of intersection of the highlight 214 with the top line 402 denotes the crown leading edge 206 of the nacelle 400. Similarly, a point of intersection of the highlight 214 with the bottom line 402 denotes the keel leading edge 208 of the nacelle 100. The intake lip 108 is at least partly defined between the highlight 214 and the throat 110.

Figure 4:
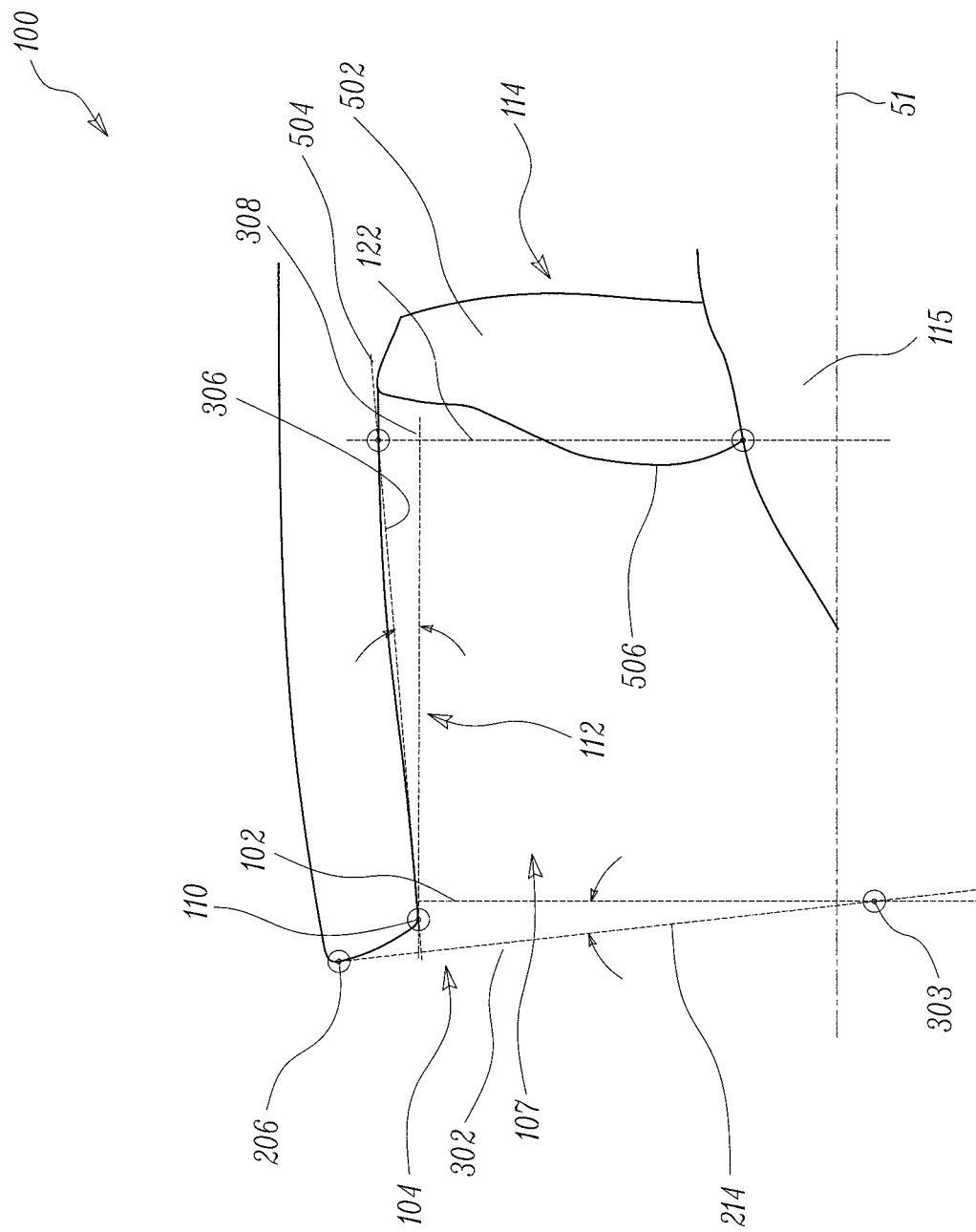
FIG. 4 is a partial sectional side view of a nacelle with a fan.

FIG. 4 illustrates a sectional side view of a portion of the nacelle 100. A portion of a top half of the nacelle 100 is shown. The nacelle 100 includes the air intake 107 with the scarf angle $\theta_{scarf}$. In the illustrated embodiment, the scarf angle $\theta_{scarf}$ is positive, i.e., the crown leading edge 206 is axially forward of the keel leading edge 208. A point A on the nacelle 100 is a point of intersection of the scarf line 302 with the highlight 214. The point A denotes the crown leading edge 206.

A point B is disposed downstream of the point A. The point B denotes the throat 110 of the nacelle 100. A point C is disposed downstream of the point B. The point C denotes the downstream end 122 of the diffuser 112. A line connecting the point B to the point C is defined as a diffuser line 306. Therefore, the diffuser line 306 is defined between the throat 110 and the downstream end 122 of the diffuser 112. A point D is a point of intersection of a leading edge 506 with the fan blade 502 and the fan hub 115. The point D denotes a fan hub leading edge. The points C and D are at equal axial positions with respect to the longitudinal centre line 51. In other words, the point C is the point on the air intake 107 that is at an equal axial position as the point D (i.e., the fan hub leading edge).

A line 308 generally parallel to the longitudinal centre line 51 passes through the point B. A diffuser angle $\theta_{diff}$ of the diffuser 112 is formed between the diffuser line 306 and the line 308. Specifically, the diffuser angle $\theta_{diff}$ is defined as an angle between the diffuser line 306 and the longitudinal centre line 51. Therefore, the diffuser angle $\theta_{diff}$ may be indicative of an inclination of the diffuser 112 with respect to the longitudinal centre line 51. In other words, the diffuser angle $\theta_{diff}$ is indicative of a degree of divergence of the diffuser 112 relative to the longitudinal centre line 51.

Some of the advantages of diffusing may include local flow acceleration and radiation of sounds in a reduced manner in or adjacent to a local area.

Various design parameters may be defined for the nacelle 100 having the short nacelle design. Optimization of such design parameters may result in a short intake design of the nacelle 100 with optimal aerodynamic performance. The design parameters include, but not limited to, a contraction ratio CR, an aspect ratio AR, and the diffuser angle $\theta_{diff}$.

In some embodiments, the diffuser angle $\theta_{diff}$ is from about 0.1 degrees to about 12 degrees. In some other embodiments, the diffuser angle $\theta_{diff}$ is greater than 7 degrees. Referring to FIGS. 1 to 4, the diffuser angle $\theta_{diff}$ of the nacelle 100 may be greater than a diffuse angle (not shown) of the conventional nacelle 500.

The contraction ratio CR is defined the square of a ratio between the highlight radius $R_{hi}$ and the throat radius $R_{th}$ (i.e., $CR=(R_{hi}/R_{th})^2$). In some embodiments, the contraction ratio CR is from about 1.15 to about 1.28 (i.e., $1.15 \leq CR \leq 1.28$).

The aspect ratio AR is defined as a ratio of a difference between the highlight $R_{hi}$ radius and the throat radius $R_{th}$ and the lip length $L_{lip}$ (i.e., $AR=(R_{hi}-R_{th})/L_{lip}$). In some embodiments, the aspect ratio AR is from about 2 to about 3 (i.e., $2 \leq AR \leq 3$).

In some embodiments, a ratio between the intake length $L_{int}$ and the highlight radius $R_{hi}$ is about 0.7 (i.e., $L_{int}/R_{hi}=0.7$). Such a value of the ratio between the intake length $L_{int}$ and the highlight radius $R_{hi}$ may correspond to shorter nacelles used in large podded engine.

The nacelle 100 the short intake design may be suitable for use as an underwing-podded nacelle of an aircraft. It should be noted that the present disclosure does not limit the nacelle 100 to be in an underwing-podded configuration. The present disclosure also does not limit the type of gas turbine engine used with the nacelle 100.

Further, the contraction ratio CR, the aspect ratio AR and the diffuser angle $\theta_{diff}$ of the nacelle 100 may be optimized for controlling various parameters, such as peak Mach number, shock strength, boundary layer growth, and local flow accelerations and decelerations. An effect of a fan on Mach number and flow diffusion may also be considered while optimizing the aforementioned design parameters of the nacelle 100.

It will be understood that the invention is not limited to the embodiments above described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A nacelle for a gas turbine engine, the nacelle comprising:
   a longitudinal center line along its length; and
   an air intake disposed at an upstream end of the nacelle, the air intake comprising, in flow series, an intake lip, a throat, and a diffuser,
   wherein the diffuser comprises a diffuser angle ($\theta_{diff}$) indicative of a degree of divergence of the diffuser relative to the longitudinal center line, and wherein the diffuser angle ($\theta_{diff}$) is from 0.1 degrees to 12 degrees,
   wherein the intake lip comprises a highlight at a leading edge of the nacelle, the highlight comprising a highlight radius ($R_{hi}$), the throat comprising a throat radius ($R_{th}$) the highlight radius being a radius of the highlight along a scarf line, and the throat radius being a radius of the throat along the scarf line, wherein a contraction ratio is defined as the square of a ratio ($R_{hi}/R_{th}$)$^2$ between the highlight radius ($R_{hi}$) and the throat radius ($R_{th}$), and wherein the contraction ratio is from 1.15 to 1.28,
   wherein the air intake comprises an intake length ($L_{int}$) defined axially along the longitudinal center line between the leading edge of the nacelle and a downstream end of the diffuser, and wherein a ratio ($L_{int}/R_{hi}$) between the intake length ($L_{int}$) and the highlight radius ($R_{hi}$) is 0.7, and
   wherein the intake lip further comprises a lip length ($L_{lip}$) between the leading edge of the nacelle and the throat, wherein an aspect ratio is defined as a ratio (($R_{hi}-R_{th}$)/$L_{lip}$)) of a difference between the highlight radius ($R_{hi}$) and the throat radius ($R_{th}$) and the lip length ($L_{lip}$), and wherein the aspect ratio is from 2 to 3.

2. The nacelle of claim 1, wherein the highlight comprises a crown and a keel spaced circumferentially apart by 180 degrees relative to the longitudinal centre line.

3. The nacelle of claim 2, wherein the scarf line is defined as a straight line between the crown and the keel, and wherein the highlight radius ($R_{hi}$) is defined as a distance between a midpoint of the scarf line and one of the crown and the keel measured along the scarf line.

4. The nacelle of claim 3, wherein the throat radius ($R_{th}$) is defined as a distance between the midpoint of the scarf line and the throat measured along the scarf line.

5. The nacelle of claim 3, wherein the intake length ($L_{int}$) is defined as an axial distance between the midpoint of the scarf line and the downstream end of the diffuser.

6. The nacelle of claim 3, wherein the lip length ($L_{lip}$) is defined as an axial distance between the keel and the throat.

7. The nacelle of claim 1, wherein a diffuser line is defined between the throat and the downstream end of the diffuser, and wherein the diffuser angle ($\theta_{diff}$) is defined as an angle between the diffuser line and the longitudinal center line.

8. The nacelle of claim 1, wherein the intake lip further comprises an outer surface and an inner surface, the highlight forming an annular boundary between the outer surface and the inner surface.

9. The nacelle of claim 1, wherein the diffuser angle ($\theta_{diff}$) is greater than 7 degrees.

10. A gas turbine engine for an aircraft, the gas turbine engine comprising a nacelle, the nacelle comprising:
    a longitudinal center line along its length; and
    an air intake disposed at an upstream end of the nacelle, the air intake comprising, in flow series, an intake lip, a throat, and a diffuser,
    wherein the diffuser comprises a diffuser angle ($\theta_{diff}$) indicative of a degree of divergence of the diffuser relative to the longitudinal center line, and wherein the diffuser angle ($\theta_{diff}$) is from 0.1 degrees to 12 degrees,
    wherein the intake lip comprises a highlight at a leading edge of the nacelle, the highlight comprising a highlight radius ($R_{hi}$), the throat comprising a throat radius ($R_{th}$), the highlight radius being a radius of the highlight along a scarf line, and the throat radius being a radius of the throat along the scarf line, wherein a contraction ratio is defined as the square of a ratio ($R_{hi}/R_{th}$)$^2$ between the highlight radius ($R_{hi}$) and the throat radius ($R_{th}$), and wherein the contraction ratio is from 1.15 to 1.28,
    wherein the air intake comprises an intake length ($L_{int}$) defined axially along the longitudinal center line between the leading edge of the nacelle and a downstream end of the diffuser, and wherein a ratio ($L_{int}/R_{hi}$) between the intake length ($L_{int}$) and the highlight radius ($R_{hi}$) is 0.7, and
    wherein the intake lip further comprises a lip length ($L_{lip}$) between the leading edge of the nacelle and the throat, wherein an aspect ratio is defined as a ratio (($R_{hi}-R_{th}$)/$L_{lip}$)) of a difference between the highlight radius ($R_{hi}$) and the throat radius ($R_{th}$) and the lip length ($L_{lip}$), and wherein the aspect ratio is from 2 to 3.

11. The gas turbine engine of claim 10, further comprising a fan received in the nacelle.

12. The gas turbine of claim 10, further comprising an engine core received within the nacelle.

* * * * *